United States Patent [19]
Hough

[11] Patent Number: 5,112,180
[45] Date of Patent: May 12, 1992

[54] SILO TOP UNLOADER

[75] Inventor: Richard M. Hough, Lansing, Mich.

[73] Assignee: Hough International, Inc., Albertville, Ala.

[21] Appl. No.: 643,735

[22] Filed: Jan. 22, 1991

[51] Int. Cl.⁵ ............................................. B65G 65/38
[52] U.S. Cl. .................... 414/305; 198/515; 198/518; 414/317
[58] Field of Search ................ 414/305-322, 414/325; 198/515, 518

[56] References Cited

U.S. PATENT DOCUMENTS

| | | | |
|---|---|---|---|
| 679,875 | 8/1901 | Blaisdell | 414/317 X |
| 822,547 | 6/1906 | Nicolson | 414/313 |
| 1,550,311 | 8/1925 | Foster | 414/314 |
| 3,229,827 | 1/1966 | Kucera | 414/318 |
| 3,368,703 | 2/1968 | Lusk | 414/317 X |
| 4,022,335 | 5/1977 | Lambert, Jr. | 414/317 X |
| 4,487,542 | 12/1984 | Johanning et al. | 414/317 X |
| 4,645,403 | 2/1987 | DeWit | 414/317 |
| 4,721,425 | 1/1988 | Ströcker | 414/317 X |
| 4,773,808 | 9/1988 | Fischer et al. | 414/317 |
| 4,815,925 | 3/1989 | Buddenberg | 414/317 X |

FOREIGN PATENT DOCUMENTS

157697  1/1957  Sweden .......................... 414/313

Primary Examiner—David A. Bucci
Attorney, Agent, or Firm—Price, Heneveld, Cooper, DeWitt & Litton

[57] ABSTRACT

A silo unloader having a framework and concentric oppositely driven rings with oppositely acting plows to shift particulate material in a silo to a central discharge defined by vertically spaced plates. The rings are driven by compressible rollers such as pneumatic tires, compressed between rings and powered by electric motors. Additional compressible friction rollers engage the wall of the silo in a vertical rolling action to guide vertical movement of the unloader and resist rotational movement of the framework which is suspended on cables.

15 Claims, 6 Drawing Sheets

SILO TOP UNLOADER

BACKGROUND OF THE INVENTION

This invention relates to silo unloaders. The common practice of storage of particulate materials such as farm feed stock or the like in a vertical silo requires means for unloading the silo as material is needed. The usual technique for unloading is to draw material off the bottom of the silo, thereby undermining it and trusting that the material thereabove will drop into the opening created. Bottom unloading often does not work so smoothly, however, due to the tendency of the material to bridge in the silo and/or otherwise hang up. It is dangerous for someone to enter the silo and attempt to rectify the situation.

SUMMARY OF THE INVENTION

An object of this invention is to provide a silo unloader that causes effective unloading of the silo at a rate and at times desired, from the top of the silo. Material is loaded from the top with a rotational, suspended unloader having balanced torque. The unloader has a central discharge drop chute with lateral passages through which the material is forced to the tube by counter-rotating plows. The plows are mounted on counter-rotating rings preferably frictionally driven by powered pneumatic wheels. Another set of vertical wheels mounted on horizontal axes keep the unloader centered in the silo, guide the unloader vertically. They also restrain the unloader frame from rotating in the silo if the torque becomes unbalanced. The central discharge is defined by a plurality of stacked, vertically spaced horizontal plates which have the lateral passages therebetween The unloader frame is suspended by cables operated by an external winch mechanism. Any tendency of torque unbalance of the counter-rotating plows causes the unloader mechanism to rise due to twisting of the spaced cables relative to each other, thereby lessening the overall torque and rate of unloading until balanced torque is again achieved.

These and other objects, advantages and features of the invention will become apparent upon studying the following specification in conjunction with the drawings.

DESCRIPTION OF THE PREFERRED EMBODIMENT

Referring now specifically to the drawings, the complete assembly 10 there depicted includes a silo 12 containing particulate material 14 to be unloaded, unloader sub-assembly 16, central discharge sub-assembly 18 and suspension sub-assembly 20 for the unloader.

Silo 12 is of conventional construction being a vertically elongated cylindrical housing of suitable material such as porcelain coated steel stainless, concrete or other materials used. In the drawings, only a portion of the silo height is shown because of space limitations. Typically, the silo height is many times the diameter thereof. The silo top unloader mechanism includes unloader sub-assembly 16, central discharge sub-assembly 18 and winch sub-assembly 20.

Figure 1:
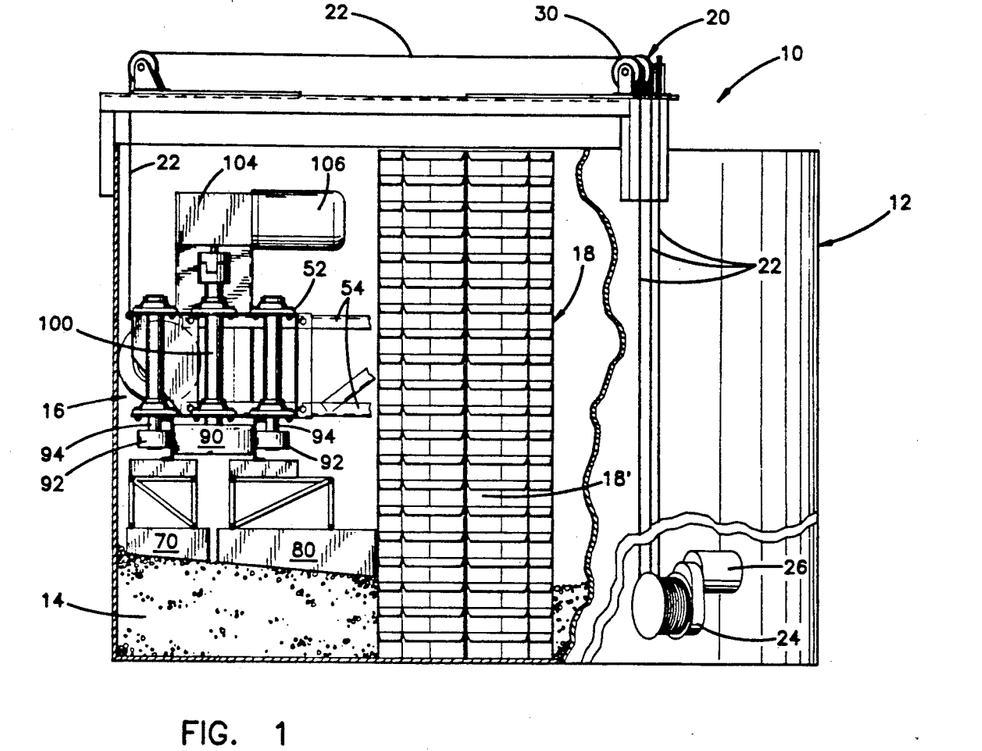
FIG. 1 is a side elevational fragmentary view of a silo and the novel top unloader mechanism therein.
Figure 2:
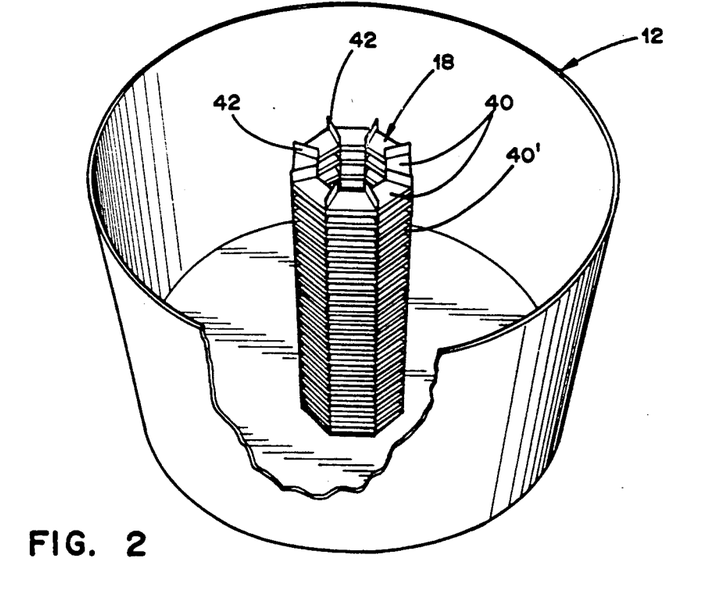
FIG. 2 is a fragmentary perspective view of the silo with the vertical stack of plates forming the central discharge chute and lateral passages cooperable with the counter-rotating unloader.
Figure 3:
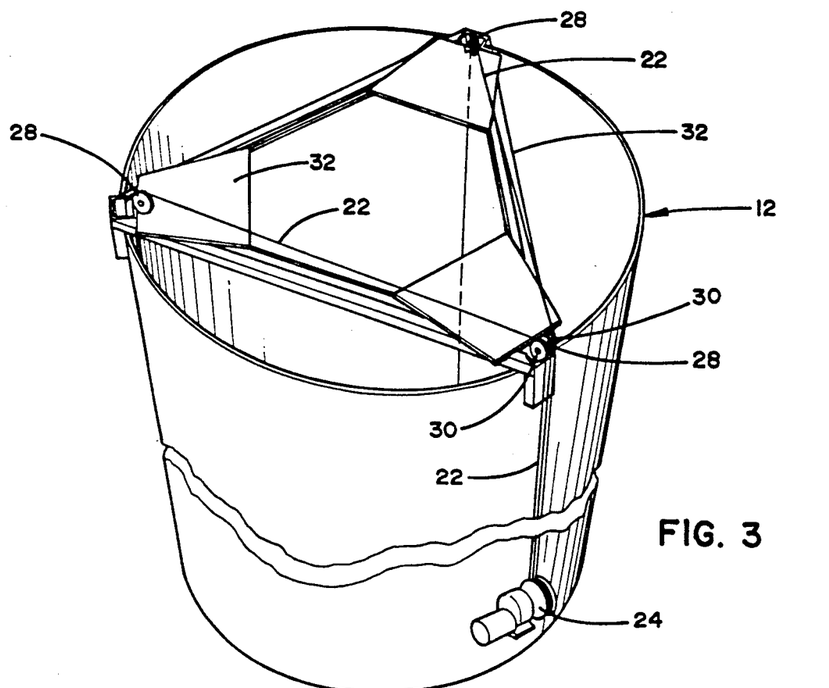
FIG. 3 is a fragmentary perspective view of the top of the silo with the silo cover removed to show the cable and winch mechanism.

Winch sub-assembly 20 may vary in construction but preferably has at least three cables 22 controlled by a winch 24 operated by suitable motor 26 preferably located outside of the silo near the base thereof (FIG. 1). The winch drum enables the cables to be wound up or played out as necessary to raise or lower the unloader sub-assembly. These cables extend up from the winch over the top of the silo so as to extend down into the silo at three equally spaced intervals, i.e. 120°apart when three cables are employed (FIG. 3). One of these cables extends directly down over its guide pulley or sheave 28 (FIG. 3) to the unloader, while the other two cables extend over idler pulleys 30, shown in FIG. 3 astraddle of pulley 28, to the other two guide pulleys 28 at intervals around the top of the silo, and downwardly to the unloader mechanism. These pulleys are mounted on a suitable framework 32 at the top of the silo (FIG. 3), such serving to fix the individual pulleys at the respective locations around the periphery while allowing each pulley to rotate about its horizontal axis.

In the central portion of the silo is the discharge sub-assembly 18 This stack sub-assembly is generally annular in cross section, with storage space outside its outer periphery and a drop chute 18' inside its inner periphery. These plates are vertically spaced to form lateral radially oriented openings for incremental portions of the granular material to be transferred from the storage space to the drop chute 18'. These elements preferably comprise individual plates 40, as of metal, stacked upon one another by a plurality of vertical panels 42 extending between each pair of plates and mounted to one and/or the other thereof Each of these plates is shown to be octagonal in configuration but can have any desired number of sides up to an infinite number i.e., circular around the outer periphery and/or the inner periphery. For convenience therefore, the term "generally cylindrical" will be used herein to describe the inner stack periphery, i.e., outer periphery of the drop chute, and to describe the outer stack periphery. The significant aspect is that the plates form lateral passages 40' therebetween for transfer of feed to the drop chute 18' at the center.

The unloader mechanism 16 transfers particulate material from off the top, radially inwardly into and through lateral passages 40' for flow to and through drop chute 18' to the bottom of the silo. At the bottom of the silo, there may be provided a space (not shown) under stack 18 for a transfer chute or a transfer conveyer (not shown) of conventional type for transfer of the discharged material to another location.

Figure 6:
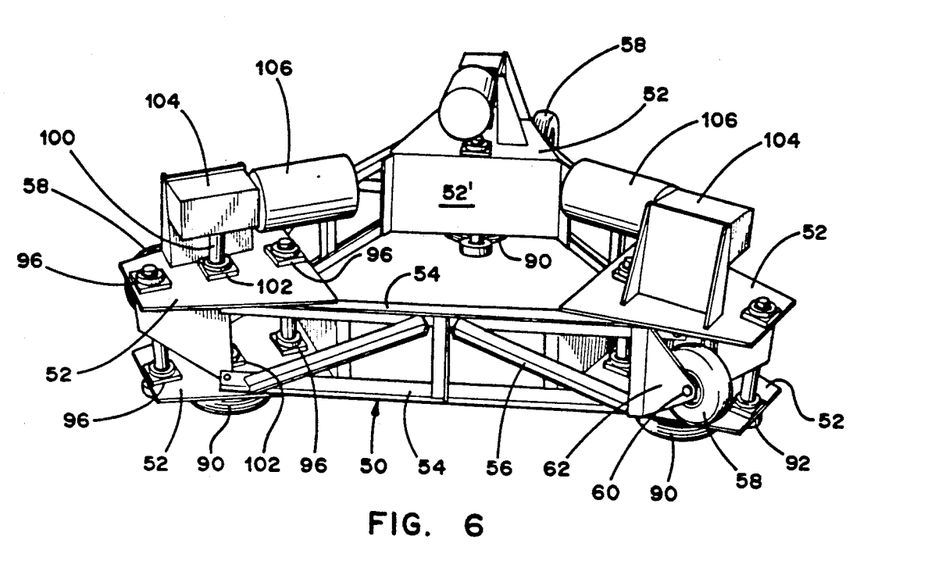
FIG. 6 is a fragmentary perspective view of the silo unloader.

The unloading mechanism 16 is suspended from the inner lower ends of cables 22 and can be lowered to the desired elevation by playing out cables 22 using winch 24. This unloading mechanism comprises a frame 50 (FIG. 6) generally triangular in configuration, shown composed of plates and beams fixed together More specifically, there are shown three pairs of horizontal, vertically spaced, parallel plates 52, each pair being connected to the adjacent two pairs by horizontal beams 54 which in turn are interconnected and braced by diagonal supports 56. These vertically spaced plates 52 are also shown interconnected by vertical panels 52' at the radial inner ends of plates 52, these vertical panels 52' preferably being integral with plates 52. Adjacent each pair of plates 52 is a compressible roller, preferably an inflated tire and wheel 58 oriented vertically, mounted on a horizontal axis 60 which in turn is suspended on a support 62 secured to the framework. These three tires 58 extend out radially further than the framework so as to engage and be compressed somewhat by the inner wall of silo 12. This engagement causes the framework to be retained centrally in the silo. The engagement also inhibits rotation of the framework within the silo due to the friction of the inflated rubber tires against the wall of the silo. At times, however, this frictional restraint be overcome with sufficient unbalance of torque be explained more fully hereinafter.

Figure 4:
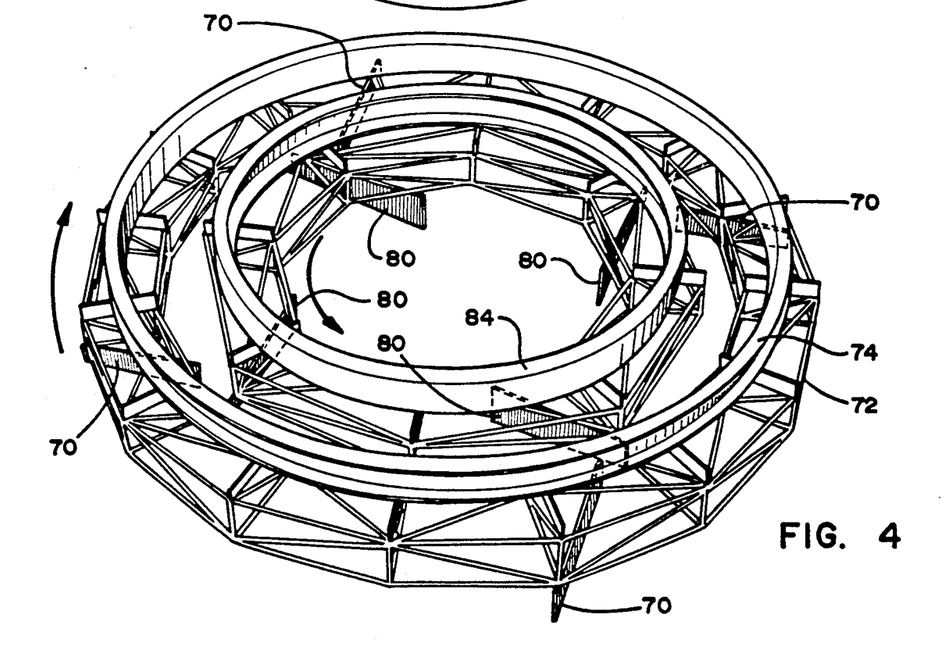
FIG. 4 is a fragmentary perspective view showing a portion of the counter-rotating plows and their supporting rings and framework.
Figure 5:
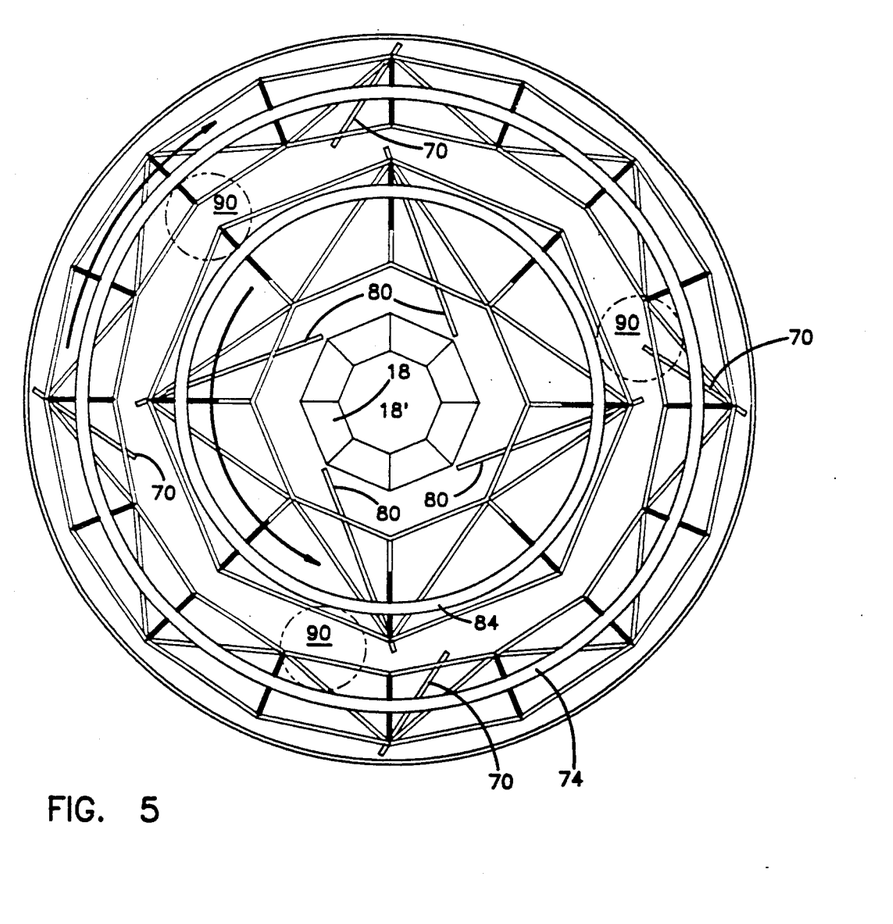
FIG. 5 is a top plan view of the silo and unloader mechanism.
Figure 7:
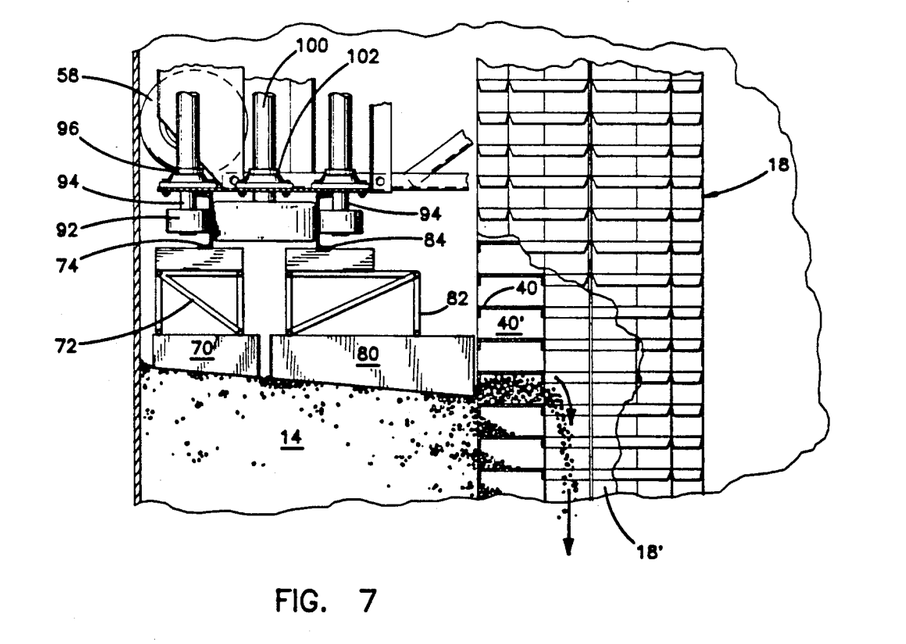
FIG. 7 is a side elevational, fragmentary sectional view of the silo and unloader showing its functions.
Figure 8:
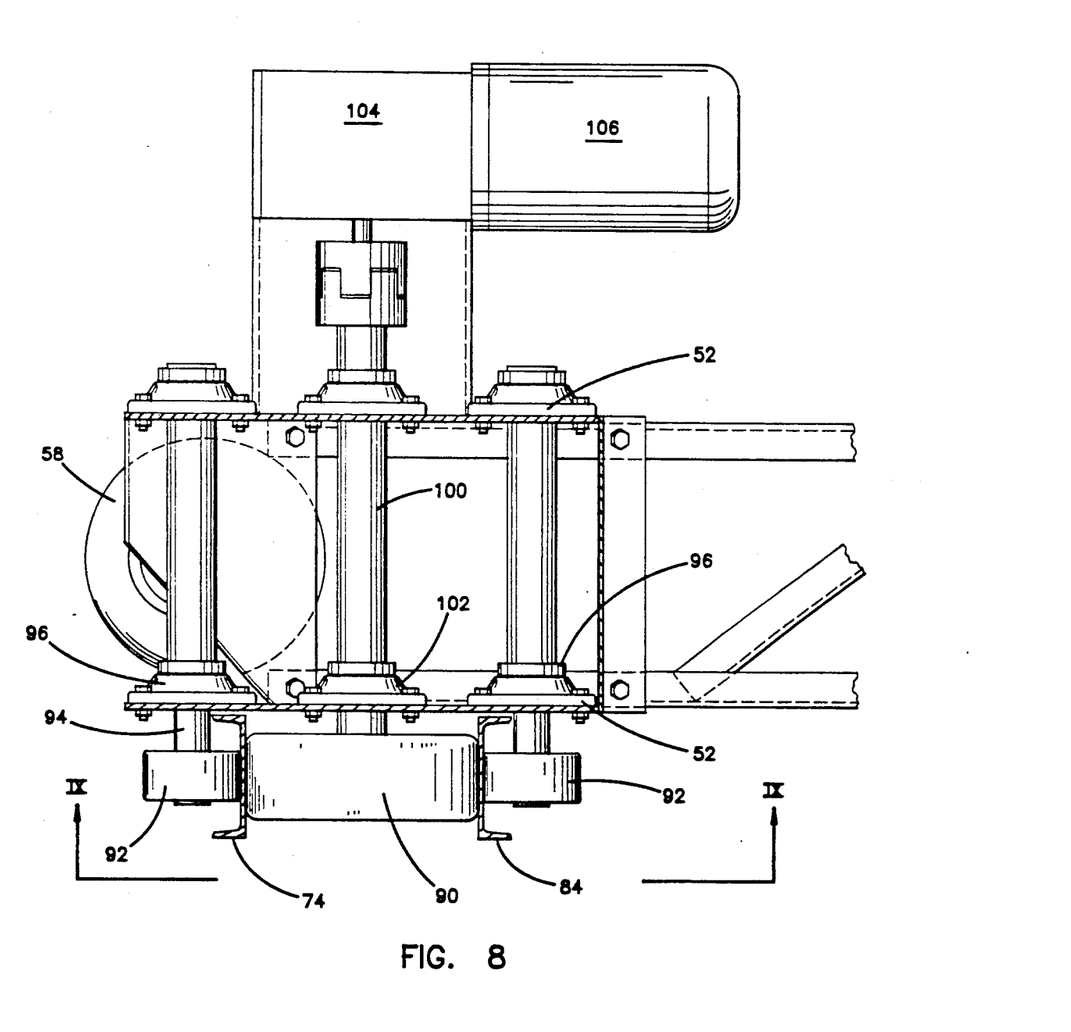
FIG. 8 is an enlarged fragmentary sectional elevational view of the unloader mechanism taken on plane VIII—VIII of the FIG. 9.
Figure 9:
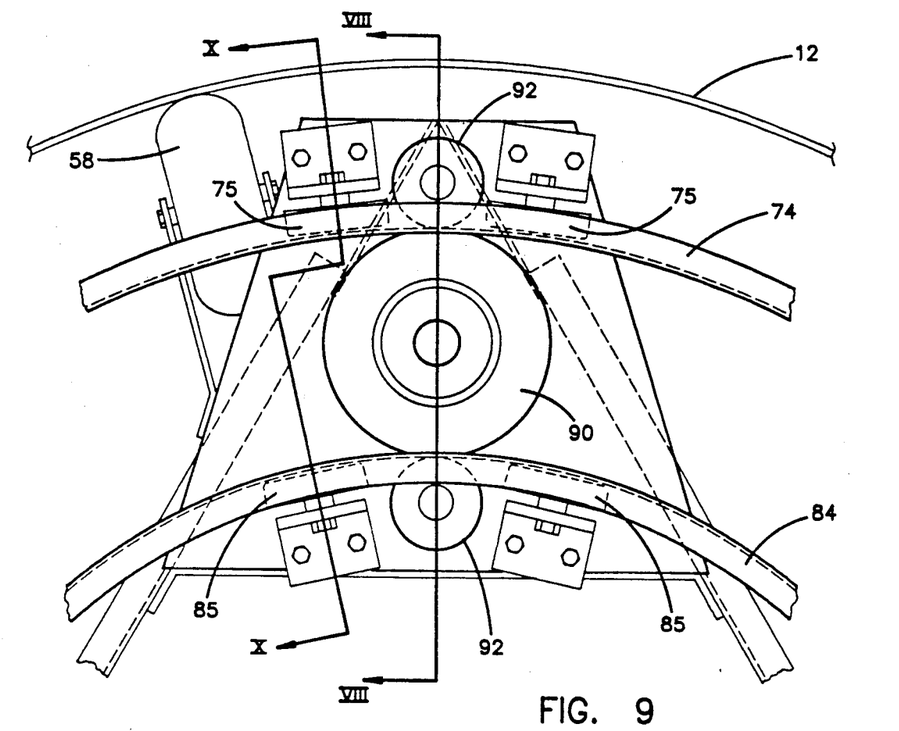
FIG. 9 is a fragmentary plan view of the mechanism in FIG. 8 taken in direction IX—IX.
Figure 10:
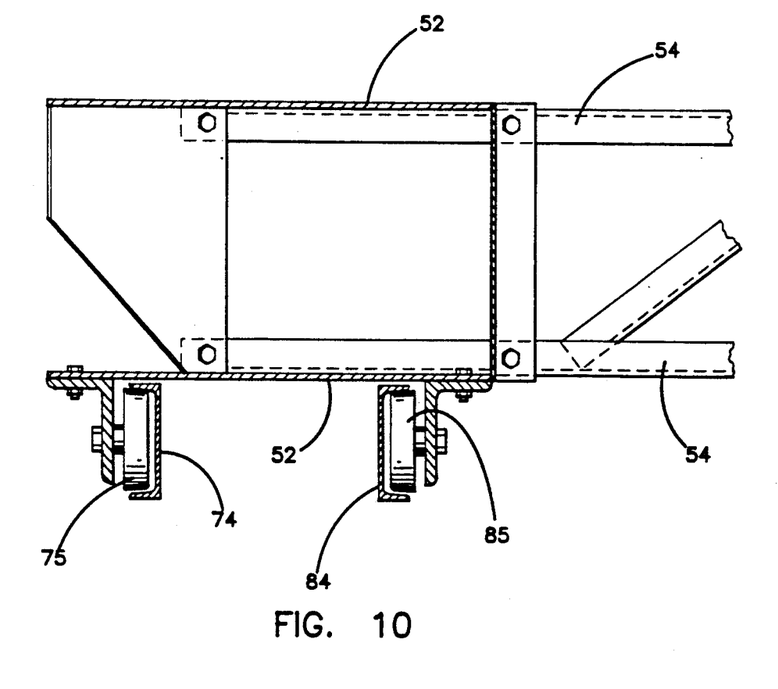
FIG. 10 is a fragmentary elevational view of one portion of the unloader mechanism taken on plane X—X in FIG. 9.

Suspended from this framework is a counter-rotating plow mechanism for forcing the particulate material radially inwardly to and through the lateral passages 40' to drop chute 18'. More specifically, a set of radially outer plows 70 is suspended on trusses 72 from an outer ring 74. Ring 74 is formed of channel iron having an outward C configuration (FIG. 7 and 4). Ring 74 is supported by rollers 75 (FIG. 10). These elements including the ring, the truss work and the plows, are rotated forcefully in one direction e.g. clockwise as from above in the depiction of FIG. 4, plows 70 being diagonally oriented to force an upper layer of the particulate materially radially inwardly toward a set of radially inner plows 80. Plows 80 are supported on truss work 82 suspended from an inner ring 84 84 is supported on rollers 85 (FIG. 10). Ring 84 is also channel shaped to have an inwardly oriented C shaped configuration. These components including ring 84, truss work 82 and plows 80 rotate in the counter direction to the outer ring assembly e.g. counter clockwise as viewed from above in the manner depicted in FIG. 4. Hence, plows 80 are diagonally oriented in the opposite direction as plows 70 such that particulate material forced inwardly by plows 70 is then forced further inwardly by plows 80 to the lateral passages 40' between panels 40. The radially inner edge of plows 80 is adjacent stack 18, causing transfer of the particulate material into passages 40' (FIG. 7). The annular width of panels 40 is chosen such that the angle of repose of the particulate material will flow into central drop chute 18' when plows 70 and 80 are forcing the material radially inwardly, but will not flow into drop chute 18' when the unloading mechanism is stationary. It will be noted that inner plows 80 are larger in cross sectional area than outer plows 70. It is desired that the torque resulting from engagement of plows 80 with the material should be approximately equal to the torque of the engagement of plows 70 with the material to give balanced torque. Since plows 80 are on a shorter "torque arm" than plows 70, relative to the center of the silo, the product of the larger plow area times the shorter torque arm should be approximately equal to product of the smaller plow area times the larger torque arm.

Rings 74 and 84 are driven in opposite directions preferably by a plurality of compressible rollers (here three in number) of pneumatic tires 90 and wheels oriented horizontally, i.e. on vertical rotational axes. More specifically, the vertical web of these rings frictionally engage the opposite inner and outer periphery of tires 90 such that powered rotation of these wheels and tires causes the rings to be driven in opposite rotational directions. The distance between the channel rings is less than the inflated diameter of the tire. Varying the inflation of the tire changes the traction ratio Rings 74 and 84 are retained in compressive condition against the periphery of tires 90 by a pair of straddling restraining rollers 92 (FIG. 7) engaging the inner surfaces of the channels forming the rings, i.e. radially inwardly and outwardly of each tire 90. These restraining rollers are mounted on vertical axles 94 extending between bearings 96 (FIG. 6) mounted on plates 52. Each tire and wheel 90 is mounted on a rotational axle 100 also having bearings 102 on plates 52, and extending above the upper plate 52 to the output shaft of a gear box 104 driven by electric motor 106.

In operation, when silo 12 is filled with particulate material to a certain level, the unloader mechanism powered by the series of electric motors 106 is lowered by winch 24 which plays out cables 22 until the counter rotating plows 70 and 80 engage particulate material 14. These plows as counter-rotated by tires 90 on rings 74 and 84 to cause plows 70 to move the particulate material radially inwardly to plows 80 which subsequently move it to lateral passages 40' between plates 40 to fall down chute 18'. If for some reason the torque between the two counter-rotating mechanisms becomes unbalanced a small amount, the frictional engagement between vertical tires 58 and the silo interior prevent the framework from rotating with the plows and rings. If however, the torque becomes considerably unbalanced, the mechanism will tend to correct itself. This is because rotational movement of the entire frame in one direction or the other will cause it to rise due to the relative twist which occurs amongst all three cables. This lessens the force of the plows against the particulate material, causing the torque to become balanced, after which the plows again slowly lower to move more material and maintain the balanced torque relationship. The winch lowers the unloading mechanism at a desired pace optimum for the particulate material being unloaded. Once the silo is emptied, the winch is reversed to shorten cables 22, thereby elevating the unloading mechanism to the top of the silo once more.

Conceivably, certain of the features depicted and described above for the preferred embodiment of the invention could be modified to suit particular circumstances or installations, to achieve the unique results while using equivalent structures. Therefore, the invention is not intended to be limited specifically to the preferred illustrated embodiment, but only by the scope of the appended claims and the reasonably equivalent structures to those defined therein.

The embodiments of the invention in which an exclusive property or privilege is claimed are defined as follows.

1. A silo unloader comprising:
 means for defining a central discharge;
 oppositely driven plow means arranged for forcing material toward said central discharge when said plow means is rotated in opposite directions;
 drive means operably associated with said plow means for rotating said plow means in opposite directions;
 said means being concentrically arranged in a manner that, when rotated in opposite directions, said plow means cooperate to successively force material toward said discharge.

2. The silo unloader in claim 1 wherein said means for defining a central discharge is vertical and has a plurality of lateral passages for transfer of material.

3. The silo unloader in claim 1 wherein said oppositely driven plow means comprise concentric rings having plows thereon, said rings being rotatable and said drive means being operably connected to said rings to rotate said rings in opposite directions.

4. The silo unloader in claim 3 wherein said plows on adjacent rings are oriented in opposite directions to successively plow material toward said central discharge.

5. The silo unloader in claim 4 including a framework having rollers supporting said rings, and said drive means being supported by said framework.

6. The silo unloader in claim 5 wherein said drive means comprises rotatably driven, compressible rollers between and frictionally engaging said rings to drive them in opposite directions.

7. The silo unloader in claim 6 including compressible rollers radially outwardly of said framework to engage the inner wall of a silo for centering of said unloader in the silo, for guiding vertical movement of said unloader in the silo, and for resisting rotation of said framework in the silo.

8. The silo unloader in claim 4 wherein said plows on respective oppositely driven rings have substantially equal torque for substantially balancing rotational force when plowing material.

9. The silo unloader in claim 9 wherein said plows on respective oppositely driven rings have substantially equal torque for substantially balancing rotational force when plowing material, and said framework is suspended from elongated cables capable of raising and lowering said framework.

10. The silo unloader in claim 3, including compressible drive rollers compressed between said rings to rotate said rings in opposite directions.

11. The silo unloader in claim 9 wherein elongated cables have upper portions restrained from rotation with any rotation of said frame in the silo, whereby any unbalance of plow force in one direction or the other direction, causing said frame to rotate in the silo, will result in said frame rising to temporarily lessen the forces to allow rebalance of the torque.

12. A silo unloader for particulate material comprising:
 means for defining a discharge;
 oppositely driven material shifting means arranged for cooperative shifting of material successively toward said discharge;
 drive means associated with said material shifting means for driving said material shifting means in opposite directions;
 said material shifting means being conentrically arranged and driven in respective rotational paths in a manner to be driven in opposite rotational directions and thereby successively force material toward said discharge.

13. The silo unloader in claim 12 including concentric rotational rings having plows thereon to form said material shifting means.

14. The silo unloader in claim 7 including compressible drive rollers compressed between said rings and rotationally driven to rotate said rings in opposite directions.

15. The silo unloader in claim 13 wherein said plows on oppositely driven rings are oriented in opposite directions and cause substantially equal torque in opposite directions to substantially balance rotational forces thereon.

* * * * *

UNITED STATES PATENT AND TRADEMARK OFFICE
CERTIFICATE OF CORRECTION

PATENT NO. : 5,112,180

DATED : May 12, 1992

INVENTOR(S) : Richard M. Hough

It is certified that error appears in the above-identified patent and that said Letters Patent is hereby corrected as shown below:

Column 1, line 36:
    After "therebetween" insert --.--.

Column 2, line 47:
    After "18" insert --.--.

Column 2, line 58:
    After "thereof" insert --.--.

Column 3, line 14:
    After "together" insert --.--.

Column 3, line 34:
    After "restraint" insert --may--.

Column 3, line 35:
    After "torque" insert --as will--.

UNITED STATES PATENT AND TRADEMARK OFFICE
CERTIFICATE OF CORRECTION

PATENT NO. : 5,112,180
DATED : May 12, 1992
INVENTOR(S) : Richard M. Hough

It is certified that error appears in the above-identified patent and that said Letters Patent is hereby corrected as shown below:

Column 3, line 51:
    Delete "84" (first occurrence).

Column 4, line 22:
    After "ratio" insert --.--.

Signed and Sealed this

Thirtieth Day of November, 1993

Attest:

BRUCE LEHMAN

Attesting Officer

Commissioner of Patents and Trademarks